United States Patent [19]
Patel

[11] Patent Number: 5,999,989
[45] Date of Patent: Dec. 7, 1999

[54] PLUG-AND-PLAY

[75] Inventor: Rahul Patel, Houston, Tex.

[73] Assignee: Compaq Computer Corporation, Houston, Tex.

[21] Appl. No.: 08/877,070

[22] Filed: Jun. 17, 1997

[51] Int. Cl.$^6$ .................................................. G06F 13/00
[52] U.S. Cl. .......................... 710/1; 710/3; 710/4; 710/5
[58] Field of Search ................................... 395/828, 829, 395/821; 710/8, 9, 1, 2, 3, 4, 5

[56] References Cited

U.S. PATENT DOCUMENTS

| | | | |
|---|---|---|---|
| 5,355,489 | 10/1994 | Bealkowski et al. | 395/700 |
| 5,634,075 | 5/1997 | Smith et al. | 395/829 |
| 5,655,148 | 8/1997 | Richman et al. | 395/828 |
| 5,748,980 | 5/1998 | Lipe et al. | 395/828 |
| 5,836,013 | 11/1998 | Greene et al. | 395/652 |

OTHER PUBLICATIONS

Intel Corporation and Microsoft Corporation, *Plug and Play ISA Specification,* Version 1.0a, Mar. 15, 1994, pp. i–iii, 4–12 and 27–59.

Compaq Computer Corporation, Phoenix Technologies Ltd., and Intel Corporation, *Plug and Play BIOS Specification,* Version 1.0, Nov. 1, 1993, pp. 1–17 and 27–66.

*Primary Examiner*—Glenn A. Auve
*Assistant Examiner*—Tim T. Vo
*Attorney, Agent, or Firm*—Akin, Gump, Strauss, Hauer & Feld, L.L.P.

[57] ABSTRACT

The present invention enhances the robustness of the Plug-and-Play BIOS, and reduces the amount of ROM work required to support each product, by rearchitecting the static support, conflict resolution, and initialization of system board devices to combine such functionality into fewer software components having greater product independence.

37 Claims, 8 Drawing Sheets

| REGISTER LOCATION | CONTENTS | |
|---|---|---|
| 00h – 01h | 55h, AAh – SIGNATURE | 162 |
| 02h | 02h – ROM SIZE | 164 |
| 03h – 06h | POINTER TO INIT CODE | 166 |
| 07h – 19h | | |
| 1Ah – 1Bh | POINTER TO HEADER DATA STRUCTURE | 168 |
| 0Ah – 0Dh | 4-BYTE DEVICE ID | 172 |
| 0Eh – 0Fh | MANUFACTURER'S ID | 174 |
| 10h – 11h | PRODUCT NAME | 176 |
| 12h – 14h | DEVICE TYPE CODE | 178 |
| 15h | | |
| 16h – 17h | POINTER TO BOOT CODE | 182 |
| AX [15:8] | UNDEFINED | |
| AX [7:3] | RESERVED; 0 | |
| AX [2] | 1, IF DEVICE IS IPL, 0 OTHERWISE | |
| AX [1] | 1, IF DEVICE IS PRIMARY OUTPUT, 0 OTHERWISE | |
| AX [0] | 1, IF DEVICE IS PRIMARY INPUT, 0 OTHERWISE | |
| ES : DI | ES IS THE START OF THE BIOS SERVICES; DI IS THE OFFSET VECTOR TO A PARTICULAR SERVICE | |
| BX | CSN OF THE CARD OR FFFFh | |
| DX | IO ADDRESS OF THE READ DATA PORT OR FFFFh | |

*FIG. 1A*

| | | |
|---|---|---|
| DEVICE NODE SIZE (IN BYTES) | 2 | 402 |
| DEVICE NODE NUMBER (OR HANDLE) | 1 | 404 |
| DEVICE PRODUCT ID | 4 | 406 |
| DEVICE TYPE CODE | 3 | 408 |
| DEVICE NODE ATTRIBUTES | 2 | 410 |
| ALLOCATION RESOURCE CONFIGURATION DESCRIPTOR | n | 412 |
| POSSIBLE RESOURCE CONFIGURATION DESCRIPTOR FIELD | n | 414 |
| COMPATIBLE DEVICE FIELD | n | 416 |

| | |
|---|---|
| 15:9 | RESERVED (MUST BE ZERO) |
| 8:7 | 00 → DEVICE CONFIGURATION IS STATIC<br>01 → DEVICE CONFIGURATION IS DYNAMIC<br>10 → RESERVED<br>11 → DYNAMIC CONFIGURATION IS POSSIBLE BUT STATIC CONFIGURATION IS NOT |
| 6 | 0 → DEVICE IS NOT REMOVABLE; 1 → DEVICE IS REMOVABLE |
| 5 | 0 → DEVICE IS NOT A DOCKING STATION DEVICE;<br>1 → DEVICE IS A DOCKING STATION DEVICE |
| 4 | 0 → DEVICE CANNOT SERVE AS IPL; 1 → DEVICE CAN SERVE AS IPL |
| 3 | 0 → DEVICE CANNOT SERVE AS PRIMARY INPUT DEVICE;<br>1 → DEVICE CAN SERVE AS PRIMARY INPUT DEVICE |
| 2 | 0 → DEVICE CANNOT SERVE AS PRIMARY OUTPUT DEVICE;<br>1 → DEVICE CAN SERVE AS PRIMARY OUTPUT DEVICE |
| 1 | 0 → DEVICE IS CONFIGURABLE; 1 → DEVICE IS NOT CONFIGURABLE |
| 0 | 0 → DEVICE CAN BE DISABLED; 1 → DEVICE CANNOT BE DISABLED |

*FIG. 4A*

```
552 ─── IRQTAG    <5,7>
554 ─── DMATAG   <1,3>
556 ─── STARTDF
558 ───        { PORTTAG  <278h - 27Fh TO 378h - 37Fh ON BOUNDARIES OF 100h>
               { MEMTAG   <1000h - 11FFh TO 2000h - 21FFh ON BOUNDARIES OF 1000h>
        STARTDF
560 ───        { PORTTAG  <3BCh - 3BFh>
               { MEMTAG   <3000h - 31FFh TO 4000h - 41FFh ON BOUNDARIES OF 1000h>
        ENDDF
```

FIG. 4B

```
                    | BYTE 1  | BYTE 2  | BYTE 3  | BYTE 4  |
                    76543210 76543210 76543210 76543210
DEVICE ARRANGEMENT: 11111122 23333344 455xxxxx xxyyyyyy yy
BITMAP:             01100101 11011110 00000000 00000000
```

FIG. 5A

| CONFIGURATION NUMBER | RESOURCE DESCRIPTION |
|---|---|
| 0 | IRQ 5, DMA 1, 278h - 27Fh, m1000h |
| 1 | IRQ 7, DMA 1, 278h - 27Fh, m1000h |
| 2 | IRQ 5, DMA 3, 278h - 27Fh, m1000h |
| 3 | IRQ 7, DMA 3, 278h - 27Fh, m1000h |
| 4 | IRQ 5, DMA 1, 378h - 37Fh, m1000h |
| 5 | IRQ 7, DMA 1, 378h - 37Fh, m1000h |
| 6 | IRQ 5, DMA 3, 378h - 37Fh, m1000h |
| 7 | IRQ 7, DMA 3, 378h - 37Fh, m1000h |
| 8 | IRQ 5, DMA 1, 278h - 27Fh, m2000h |
| 9 | IRQ 7, DMA 1, 278h - 27Fh, m2000h |
| 10 | IRQ 5, DMA 3, 278h - 27Fh, m2000h |
| 11 | IRQ 7, DMA 3, 278h - 27Fh, m2000h |
| 12 | IRQ 5, DMA 1, 378h - 37Fh, m2000h |
| 13 | IRQ 7, DMA 1, 378h - 37Fh, m2000h |
| 14 | IRQ 5, DMA 3, 378h - 37Fh, m2000h |
| 15 | IRQ 7, DMA 3, 378h - 37Fh, m2000h |
| 16 | IRQ 5, DMA 1, 3BCh - 3BFh, m3000h |
| 17 | IRQ 7, DMA 1, 3BCh - 3BFh, m3000h |
| 18 | IRQ 5, DMA 3, 3BCh - 3BFh, m3000h |
| 19 | IRQ 7, DMA 3, 3BCh - 3BFh, m3000h |
| 20 | IRQ 5, DMA 1, 3BCh - 3BFh, m4000h |
| 21 | IRQ 7, DMA 1, 3BCh - 3BFh, m4000h |
| 22 | IRQ 5, DMA 3, 3BCh - 3BFh, m4000h |
| 23 | IRQ 7, DMA 3, 3BCh - 3BFh, m4000h |
| -1 | DEVICE DISABLED |

FIG. 5B

```
rpnpNvsTable      label byte
        db        "$NV
        db        rpnpNvsTableEnd-rpnpNvsTable
                                    ; Length of NVS Table in bytes
        dw        90h               ; Starting index of CMOS data
        db        4                 ; Length in bytes of CMOS data
        dw        6                 ; # of bits needed for device 1
        dw        011001b           ; # default configuration number for device 1
        dw        2                 ; # of bits needed for device 2
        dw        01b               ; # default configuration number for device 2
        dw        4                 ; # of bits needed for device 3
        dw        1101b             ; # default configuration number for device 3
        dw        3                 ; # of bits needed for device 4
        dw        111b              ; # default configuration number for device 4
        dw        2                 ; # of bits needed for device 5
        dw        00b               ; # default configuration number for device 5
        db        ?                 ; Table checksum is updated at POST
rpnpNvsTableEnd   label byte
```

*FIG. 5C*

PLUG-AND-PLAY

RELATED APPLICATIONS

This application is related to U.S. application Ser. No. 08/877,072, entitled "System Board Plug-and-Play Autoconfiguration," by Rahul Patel, concurrently filed and commonly assigned to Compaq Computer Corporation.

BACKGROUND OF THE INVENTION

1. Field of the Invention

The present invention relates to configuration of computer systems, and more specifically to the storage of configuration states corresponding to computer systems.

2. Description of Related Art

The availability of non-volatile memory is ever decreasing, while the need to store more and more complex configuration information keeps increasing. Moreover, to support new hardware configurations, storage of hardware setting into non-volatile memory has had to be done by hand for each product. Thus, the layout and usage of non-volatile memory is very inefficient. Also, changing the code every product increases the potential for programming errors.

Each product, when configured, typically requires a set of configuration information to be placed into non-volatile memory corresponding to the hardware. When configured, the memory associated with the device is filled with configuration information, determined by a configuration algorithm. However, some configuration information is similar for similar products. Nevertheless, this prefix information is stored separately for each product. The storage of this configuration setting in the non-volatile memory requires greater use of non-volatile memory, and is highly product and version specific. As new products are developed and new versions introduced, more information to distinguish one product from another must be added to the configuration register, to adequately describe differences among various products.

Not only does the configuration data evolve, but also the storage processes must be adapted to new products. The ROM (read only memory) BIOS (basic input/output system) must contain processes for identifying and configuring an enormous assortment of possible products within the system. Product dependent packing and unpacking configuration processes occupy a large portion of the ROM BIOS, and impose minimum space requirements within the system ROM.

SUMMARY OF THE INVENTION

The present invention enhances the robustness of the Plug-and-Play BIOS, and reduces the amount of ROM work required to support each product, by rearchitecting the static support, conflict resolution, and initialization of system board devices to combine such functionality into fewer software components having greater product independence.

BRIEF DESCRIPTION OF THE DRAWINGS

A better understanding of the present invention can be obtained when the following detailed description of the preferred embodiment is considered in conjunction with the following drawings, in which:

FIG. 1A shows the contents of a device Plug-and-Play device ROM;

FIG. 4 and FIG. 4A show a devnode structure;

FIG. 4B shows an example of devnode resources;

FIG. 5A and FIG. 5B show the CMOS layout of the systemboard Plug-and-Play and NVS abstraction;

FIG. 5C shows an example NVS table corresponding to the layout of FIGS. 5A and 5B.

DETAILED DESCRIPTION OF THE PREFERRED EMBODIMENT

TYPICAL HARDWARE OF A COMPUTER SYSTEM

Computer systems typically have a number of devices coupled to a system bus or motherboard, including at least one microprocessor, at least one bus, a system memory, an input device such as a keyboard controller and an output device such as video monitor display controller. Often, however, computer systems are expanded by adding other devices such as peripheral disk drives, printers, a cache memory, modem connections, other IDEs, audio speakers, and a wide array of other options. Adding still more devices to a computer system can be accomplished via expansion buses, such buses that conform to PCI, ISA, EISA, microchannel, and other bus standards. The buses have slots for receiving expansion cards that can be inserted into the slots. Expansion cards, like the embedded cards on the motherboard, are inserted into either the motherboard or an expansion bus where the cards are accessible to other devices in the system. Most expansion devices are generally purchased connected via a cable or wire to a small card that comes with one or more devices. To use the device, someone inserts the card into one of the slots in one of the buses in the computer system, restarts (or "reboots") the system, and the device is now available.

Figure 1:
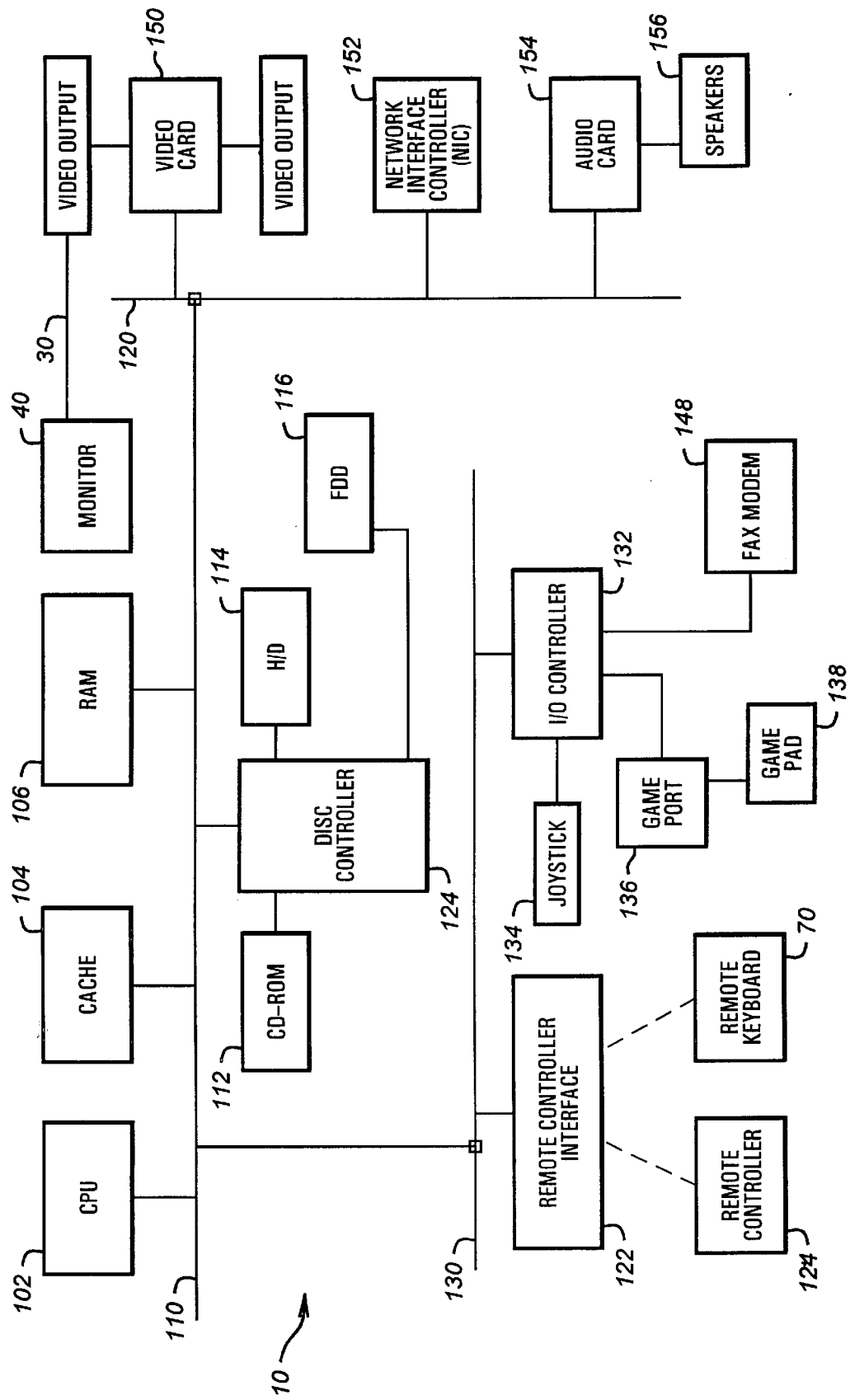
FIG. 1 shows a typical computer, including a system ROM.

As shown in FIG. 1, a central processing unit 102 is coupled to a host bus 110. The central processing unit 102 may be a single microprocessor, such an Intel Corporation's 486 or Pentium, or a more complete CPU system including multiple microprocessors, a cache controller, external co-processors, and other components, coupled to one another or to the host bus 110. The host bus 110 functions to interface the CPU 102 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high speed static RAM structure, addressable within the memory space of the CPU's address lines.

A main memory, typically comprising a dynamic RAM 106, is coupled to the host bus 110. The main memory provides relatively high speed data storage for instructions and data needed for the processor to perform its functions.

Also coupled to the host bus 110 is a disc controller 118. The disc controller 118 typically has a number of IDE ports to couple external devices. The disc controller 118 may be coupled directly to the CPU or to main memory, or may be a separate device on the host bus 110. The disc controller 118 provides a connection to a CD ROM 112, a hard disc 114, a remote controller interface 122, and an input/output controller 132, and a floppy disc drive 16. The CD ROM 112 provides optical storage and data retrieval capabilities, and the hard drive 114 and floppy disc drive 116 provide magnetic storage device capabilities to the computer system.

Also coupled to the host bus 110 are two extension buses. The first extension bus is a PCI bus 120, coupled to the host bus 110 via a PCI bridge. The PCI bus 120 is coupled to a plurality of additional devices, including the aforementioned video card 150, a network interface controller 152, an audio device or audio card 154, a fax modem 148, and in some embodiments an additional PCI bridge (not shown). The video card 150 typically includes a graphics processor and a video graphics adapter, and is coupled to a monitor 40 via a coaxial cable 30 or other computer connector. The audio device 154 generally is coupled to audio speakers 156 or other audio output device to provide an audio output.

A second extension bus 130 is coupled to the host bus 110, providing an extension for additional peripheral components. Although typically configured as an X-bus or be an ISA bus, the extension bus 130 may alternately be configured as an EISA, a PCI bus, a microchannel bus, or any of a variety of other bus structures commonly used and known.

The remote controller interface 122, coupled to the second extension bus 130, provides infrared signal detection, and is optically and remotely coupled to a remote keyboard 70 and a remote controller 124. The remote keyboard 70 and remote controller 124 allow a human user or an external device to communicate data via the remote controller interface 122 to the computer system C, without direct wired connection.

The input/output controller 132, also coupled to the second extension bus 130, provides connection between the extension bus 130 and various devices, including a game port 136 coupled to a game pad 138 and to a joy stick 134. Although these devices are shown coupled through the input/output controller 132 to the extension bus 130, it will be recognized that other configurations are possible; for example, the joy stick 134 may instead be coupled to an infrared device for communicating directly to the remote controller interface 122.

A system ROM, on the main bus, typically includes the system firmware, including the BIOS and operating system, that are installed automatically when power is applied to the system.

The firmware may be run statically from the system ROM, or may be shadowed into system RAM and run dynamically from the RAM. In many computer systems, the hardware configure itself according to the instructions in the BIOS upon power up.

It will be recognized that additional devices may be coupled via IDE controllers and other connectors to the various buses, providing resources and buffering for external devices. The flexibility of the computer system therefore is not restricted to the particular example shown in the figure. Moreover, as stated above, additional devices may be added to a computer system via expansion buses, by inserting into a bus slot an expansion card that is connected via a cable or wire to the additional device.

Devices that exchange data with the microprocessor typically are assigned IO space allocations that may or may not be shared with other devices. Devices include memories, as well as peripheral and other devices. To encode the process of communicating with the devices in the system, the POST typically creates within non-volatile memory an allocation map, allowing a particular device to be identified by an identifier or "handle" of only a few bits, and a controller translate the handle into an identification of the corresponding resource and by IO address. For example, a printer may have an identifier or "handle" or other brief identifier, a resource such as an interrupt request line, and an IO space allocation for addressing characters from the microprocessor to the printer. The microprocessor can then address the particular IO location to send data to the printer, and the printer can use the interrupt request line to indicate a "ready to receive data" status or a printer-problem status. The map is in the form of a table, and if it is in nonvolatile memory, will start up with the list of resources assigned to configurable installed devices during a previous session.

THE SYSTEM ROM

As stated above, in a typical computer system, a system ROM is coupled to the motherboard's main bus. The system firmware typically resides in a system ROM, located on the motherboard. The system ROM typically contains a system BIOS that is specifically tailored for the system hardware, or for a limited predetermined set of possible hardware configurations. A BIOS designed for one system generally will not operate properly, if at all, on another system unless the two systems are identical in design, or differ in design only in one of the predetermined ways that the BIOS can accommodate. Because of the close association of the BIOS and the hardware design, BIOS development is considered an extension of hardware design, not software. As new hardware designs are produced, manufacturers must develop variations to existing BIOS routines, or new BIOS routines altogether, to handle the new hardware. Moreover, many new BIOS routines are intended to retain some backward compatibility with prior hardware versions, adding complexity to the design.

Although different BIOS designs perform essentially the same steps in slightly different order, the BIOS must at some point read registers within the devices themselves to determine what devices exist on the system, and what the resource requirements are for those devices. Only after reading these registers can the BIOS determine an appropriate allocation of system resources to configure a maximum number of devices. Also, the BIOS can determine from the information obtained from device registers what drivers to load into memory, to allow the microprocessor to access the device. The driver may be in the ROM as well, particularly if the driver is nonstandard; if multiple devices use the same driver, however, the BIOS may load all into memory when the system is initialized.

THE SYSTEM POST ROUTINE

As shown in FIG. 1, a typical computer system includes a number of devices (in addition to the system ROM) residing on the system buses. Because these devices may be changed for other devices by a user, the system cannot "know" beforehand what devices are coupled to the system. Determining what devices are on the system, configuration of the devices, setting up memory for the operating system, and initializing and testing hardware (POST, Powre On Self Test) are performed by the BIOS.

Each platform typically includes a number of unconfigurable devices requiring specific, dedicated resources, and a number of configurable devices. The POST program may be structured for a particular platform, in which case it is designed to accommodate a particular set of unconfigurable system resources.

Figure 2:
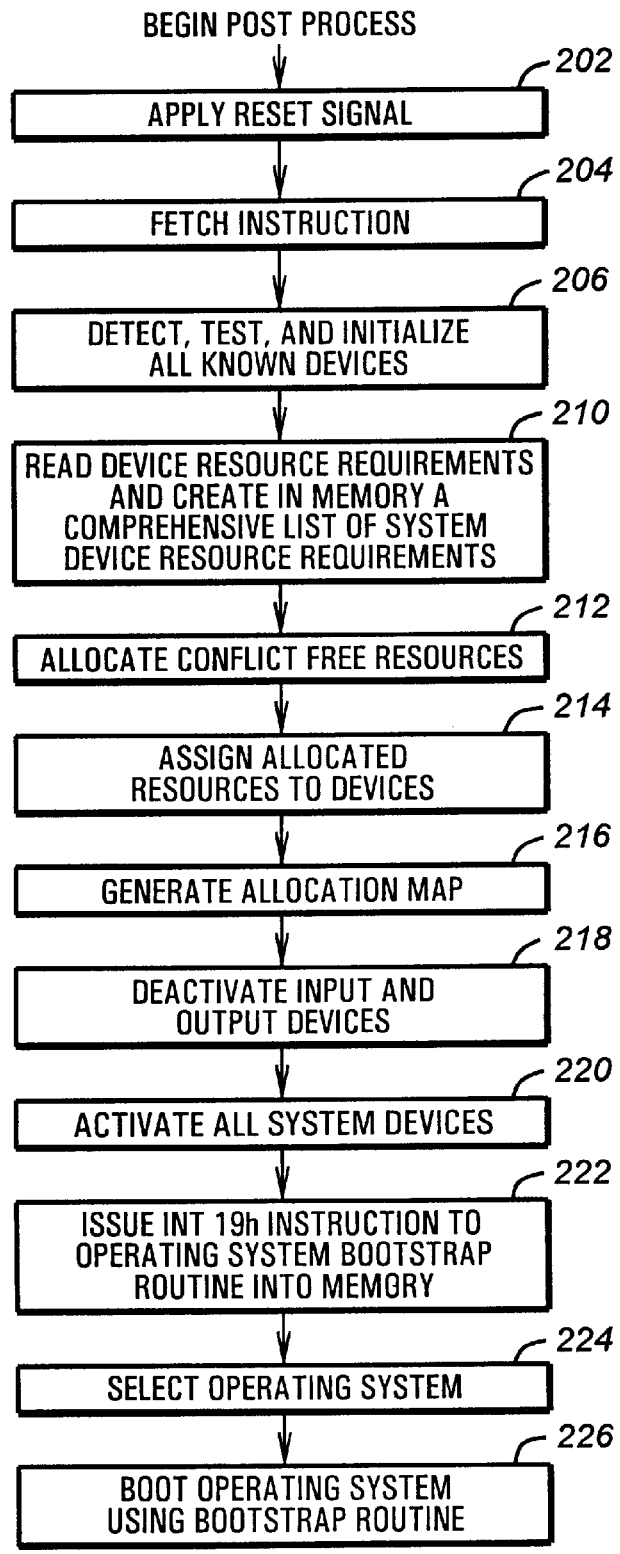
FIG. 2 shows a flow-chart representing a typical POST sequence compatible with the Plug-and-Play methodology.

Referring now to FIG. 2, a flow chart representing a typical POST sequence, according to the plug-and-play system architecture, is shown. As stated previously, the POST and other BIOS routines are typically stored in a system ROM and shadowed (i.e., copied) into RAM for faster execution and wider data channels. The PCI spec requires shadowing and other bus specifically also strongly recommend it. At step 202, a reset signal is applied and remains active until power supply outputs have stabilized. The reset signal forces all device logic to a predefined state, insuring global initialization predictability. At step 204, a first instruction is fetched from a predefined restart address. The fetching of the restart address occurs when the reset signal is deactivated, normally as soon as power fluctuations have stabilized. The fetched address is the entry point of the POST program, typically in system ROM memory.

The POST routine is then shadowed in to RAM, where it may then be run more quickly.

At step 206, the POST detects, tests, and initializes all known devices to the state for normal system operation. In step 206, devices, including the interrupt controller, the DMA controller, and programmable timers, as well as other devices, are merely turned on, tested, and set to a default state (i.e., a "wait" or "wait for key" state) for the device, having no device configuration, IO space allocation, or resource assignment.

As part of the initialization, the POST then tries to turn all of the devices off, to determine which devices might be useful in finding and launching the operating system. Typically, devices might be useful in finding and launching the operating system cannot be deactivated by software; they are activated so long as power is applied to the system. Also, such devices cannot be reallocated, since they need specific, dedicated resources. By attempting to turn off the devices, only those that are useful for booting the operating system remain activated. These devices ("initial program load" devices) include the system ROM, and generally include a keyboard controller and a video adapter as well. All other devices are deactivated.

Because the purpose of the BIOS is to prepare the system for the booting of an operating system, devices are segregated into two groups: one group, the IPL devices, are determined to be needed for booting the operating system. The IPL devices typically cannot be deactivated, and typically require highly specific resources. As such the IPL devices cannot be configured by software. The other group of devices, which can be configured or deactivated by the software, are typically initiated and configured by the BIOS only when it is determined that an operating system other than Plug-and-Play compatible is to be booted. This is because Plug-and-Play compatible operating systems typically can perform their own hardware configurations; performing an initial configuration in the BIOS would be pointless since the operating system would reconfigure the system anyway.

The POST then turns the other devices back on, and sets them to a "wait" state (also known as the "wait for key" state). The devices remain in the wait state until isolated and configured by the BIOS. Step 206 is completed when the configurable devices are transitioned to the wait state. Isolation of Plug-and-Play devices is described below with reference to FIG. 3, to provide a fuller understanding of device configuration. It will be recognized that the ISA paradigm is not directly affected by the invention.

The IPL devices, now having been identified, are initialized by performing any initialization routines contained within the IPL device ROMs. Then, the BIOS examines the operating system to determine whether any additional devices may be needed to load and launch the operating system. For example, if the operating system is not compatible with the Plug-and-Play methodology, then all devices must be activated and initialized; but when Plug-and-Play operating systems are used, only certain IPL devices that do not require configuration are used. Therefore, any necessary device is activated, and initialized according to its option ROM.

If the operating system cannot perform system configuration, the BIOS continues, configuring the system, and then launches the operating system before terminating. If the operating system can perform system configuration, the BIOS launches the operating system and terminates, allowing the operating system to continue with system configuration.

The system BIOS is designed to have access to system resource information, and therefore "knows" what system resources are available. The devices are isolated and are read to determine the resource requirements of the devices. In step 210 a comprehensive list of system resources is created in memory, and the system devices are configured. In step 212, conflict-free resources are allocated, and in step 214, an allocation map storing the system configuration is generated and verified, completing the configuration process. At step 218, all system devices are activated and deactivated, to identify any additional devices needed to boot the operating sytem (devices needed to boot the operating system typically cannot be deactivated, while all other devices can), and if any are found steps 206–218 are repeated to allocate the necessary resources to the necessary devices. At step 220, all system devices are activated. At step 222, an TNT 19*h* command is issued by the POST to load the bootstrap routine into memory. The OS bootstrap routine actually loads the operating system, and hooks necessary memory locations to the operating system pointers. The operating system is selected at step 224 (usually, only one is available, although more may be present and identified as being useable only if no preferred operating system is present). At step 226, the selected operating system is booted using the bootstrap routine. System configuration assigns system resources to configurable devices, avoiding conflicting assignments and ensuring that each device receives adequate resource allocation to perform its functions. Typically, system configuration begins when all configurable devices are in the wait state. Any activated devices that have option ROMs but that have not been initialized, are initialized according to their option ROMs. A double check is performed to determine whether any Plug-and-Play ISA devices have been activated but not initialized, and if any such ISA devices are found and have option ROMs corresponding thereto, the option ROMs are read for initialization code which is then executed. All devices in the system are checked for device ROMs and are initialized from the device ROMs.

System configuration includes device ROM shadowing and initialization, device isolation, resource requirement identification, available system resource determination, and resource allocation. These operations are now described in more detail.

DEVICE ROM SHADOWING AND INITIALIZATION

Referring now to FIG. 1A, the contents of a device Plug-and-Play device ROM is shown. Locations 00*h*–01*h* of all plug and play device ROM contain 55*h*, AAh, the signature of a device ROM. The device ROM signature 152 is used in the isolation routines. Isolation of Plug-and-Play devices is described below with reference to FIG. 3, to provide a fuller understanding of device configuration. It will be recognized that the ISA paradigm is not directly affected by the invention. The device ROM size is encoded in location 02*h;* the number of 512-byte blocks in the device ROM size is stored in the option ROM location 02*h*. For example, if the device ROM size code 154 is 02*h,* then the device ROM contains 1024 bytes of information.

Locations 03h–06h 156 contains a ponter to the option ROM initialization code, and locations 1Ah–1Bh 158 contain a pointer to the option ROM header data structure. The ROM header structure resides in the option ROM at the address indicated in locations 1Ah–1Bh 158 of the ROM header. The ROM header structure is what indicates to the configuration software whether the device can act as a boot device, and further defines fixed (un-reallocatable) resources. Any fixed resources demanded by an option ROM must be accommodated if the device is to be operational.

To initialize the option ROM, the POST and device ROM jointly perform the DDIM (device driver initialization model). Locations 00h and 01h and locations 1Ah and 1Bh are examined for a signature. Then, a far call is made to location 03h of the ROM, branching to an entry point elsewhere in the ROM that initializes the device. The initialization code is copied (shadowed) into RAM for faster execution and for wider data channels and is executed, initializing the devices's IO register set. The initialization code hooks an interrupt table entry to the interrupt service routine within the ROM's code image (if the ROM code is shadowed) or within the ROM itself (if not shadowed), and hooks an interrupt table entry to a device-specific BIOS routine within the ROM's code image (if the ROM code is shadowed) or within the ROM itself (if not shadowed). The initialization code may then eliminate itself from the RAM (by deleing itself, shortening the length of the image field in the RAM and recomputing the image checksum) since the device will not have to be reinitialized until the next re-boot.

Execution of the initialization code, once completed, obviates the need to retain the initiation code itself in memory, so the code is then removed from RAM. If the configuration of the device has been changed since the last session, the device configuration established by the execution of the BIOS (copied from the system ROM) may be altered by the device ROM initialization code, particularly in the given memory location dedicated to the device. The BIOS continues to execute, however, after the device initialization code is completed, and therefore, because the device ROM is copied and shadowed into the system RAM, values may be altered by the system BIOS. Reallocation and reconfiguration is possible due to the shadowing.

The initialization code then performs a far return to the POST, which (if the initialization code is deleted) deallocates any memory reserved for device initialization code. The POST then performs a device-specific write-protection of the ROM image in RAM. This initializes the device.

Locations 0Ah–0Dh 162 of the ROM header structure indicate a 32-bit (4-byte) Plug-and-Play device ID, which is identical to the E/ISA device ID. Locations 0Eh–0Fh 164 indicate a 16-bit (2-byte) manufacturer's ID, and locations 10h–11h 166 define a two-byte product name. Each manufacturer assigns to each card of a given type a unique 32 bit number, such that no two devices of the same manufacturer in the same system have the same 16 bit number. The 32-bits of the device ID, as well as 32 pseudo-random bits assigned to each device by each manufacturer and an 8-bit checksum, determine the 72-bit serial identifier used in the isolation process.

Locations 12h–14h 168 of the ROM header structure define a device type code, which is the same as the PCI class code. As will be described below, the device type code is used to determine an alternate device driver if a driver specifically compatible with the device cannot be found. Each driver has a device type (or PCI class) with which the driver can be used. Several drivers may exist in the system for each type or class, since each device may come with its own driver and several devices in the same class may exist in the same system. Nevertheless, if a device driver is missing from the system memory or otherwise cannot be accessed, the device driver of another device in the same type or class may be used.

Location 16h–17h 182 of the ROM header structure define boot connection vector, pointing to an address within the ROM of the boot connection routine. It will be remembered that, typically, boot devices require dedicated resources. When executed as a boot device and passed certain register arguments, the boot connection routine hooks the desired interrupt table entries. The input register arguments for the boot connection routine include AX, ES:DI, BX, and DX, where AX, ES:DI, BX, and DX are defined as follows:

AX[15:8] are undefined, and AX[7:3] are reserved and must be zero.

AX[2] defines whether the device is the IPL, in which case INT31h is hooked to call the disk BIOS function call entry point. AX[1] denotes whether to connect the device as a primary output, in which case INT 10h INT31h is hooked to call the display BIOS function call entry point, while AX[0] denotes whether to connect the device as a primary input, hooking INT 09h to call the keyboard BIOS function call entry point.

ES:DI points to the Plug-and-Play BIOS installation check structure (in "segment:offset" format). The ES:DI register-pair indicates the starting address of the BIOS installation check structure, providing an entry point to the BIOS services (some of which may not be available until after the operating system has loaded), and the offset starting address DI provides a selection of particular BIOS services desired.

BX contains either the CSN of the card (if the card is an ISA card) or FFFFh (if not);

DX is the IO address of the E/ISA read data port of the card (if the card is an E/ISA card) or FFFFh (if not).

On return from the initialization routine, the lower 9 bits of the 16-bit A register are set to report whether as an IPL device, an output device, or an input device, the device supports the proper BIOS routines, and whether any IPL device, output device, or input device is attached.

Thus, each device's initialization routine places the values defining its resource requirements, ability to be used for booting, and 10/interrupt hooks where in memory the configuration software can find them.

SYSTEM DEVICE ISOLATION

Once the devices are activated and are placed in the wait state, the devices are isolated. The isolation routine for Plug-and-Play devices is described with reference to FIG. 3, to provide a fuller understanding of device configuration. It will be recognized that the ISA paradigm is not directly affected by the invention. Device isolation assigns to each card a unique number to distinguish the card from the other cards within the system. The unique assignment of a Card Serial Number (CSN) to each card is compatible with the EISA specification. The CSN is a unique number that provides an identifier or "handle" by which the microprocessor can indicate over the system bus that a particular message is intended for a particular device, and by which a device can identify itself when generating interrupt and other messages for the microprocessor.

Uniquely identifying cards in the system is vital to proper operation. If multiple identical devices are used in the same system, and no effort is made to distinguish the devices, the result is unpredictable. For example, if one of several printers in a system sends an interrupt request to the peripheral interrupt controller indicating that a paper-tray is empty, and the microprocessor could not identify the particular printer, the device driver associated with the printer might unfortunately terminate all data to all of the other similarly-configured devices until the problem is fixed. Similarly, if another device sends a "status-okay" signal, the data stream for the inoperable device may be resumed prematurely.

The isolation routines of the Plug-and-Play methodology rely on the use of EISA-like 72-bit serial identifier (64-bit value plus 8-bit checksum) that manufacturers ensure will be different for any two devices in the system. Each vendor is assigned a unique 32-bit value with which the serial bit identifier of each device the vendor provides must begin. The vendor then provides a different 32-bit sequence for each unit of like type produced. This ensures that each device in the system has a different non-zero 72-bit (9-byte) serial identifier.

Each device has a configuration port having a number of register stacks. Each device stores its serial identifer in a read-only register in register stack location 01*h* of the configuration port, also known as the serial isolation register. The CSN, when assigned, is located in register stack location 06*h*.

Figure 3:
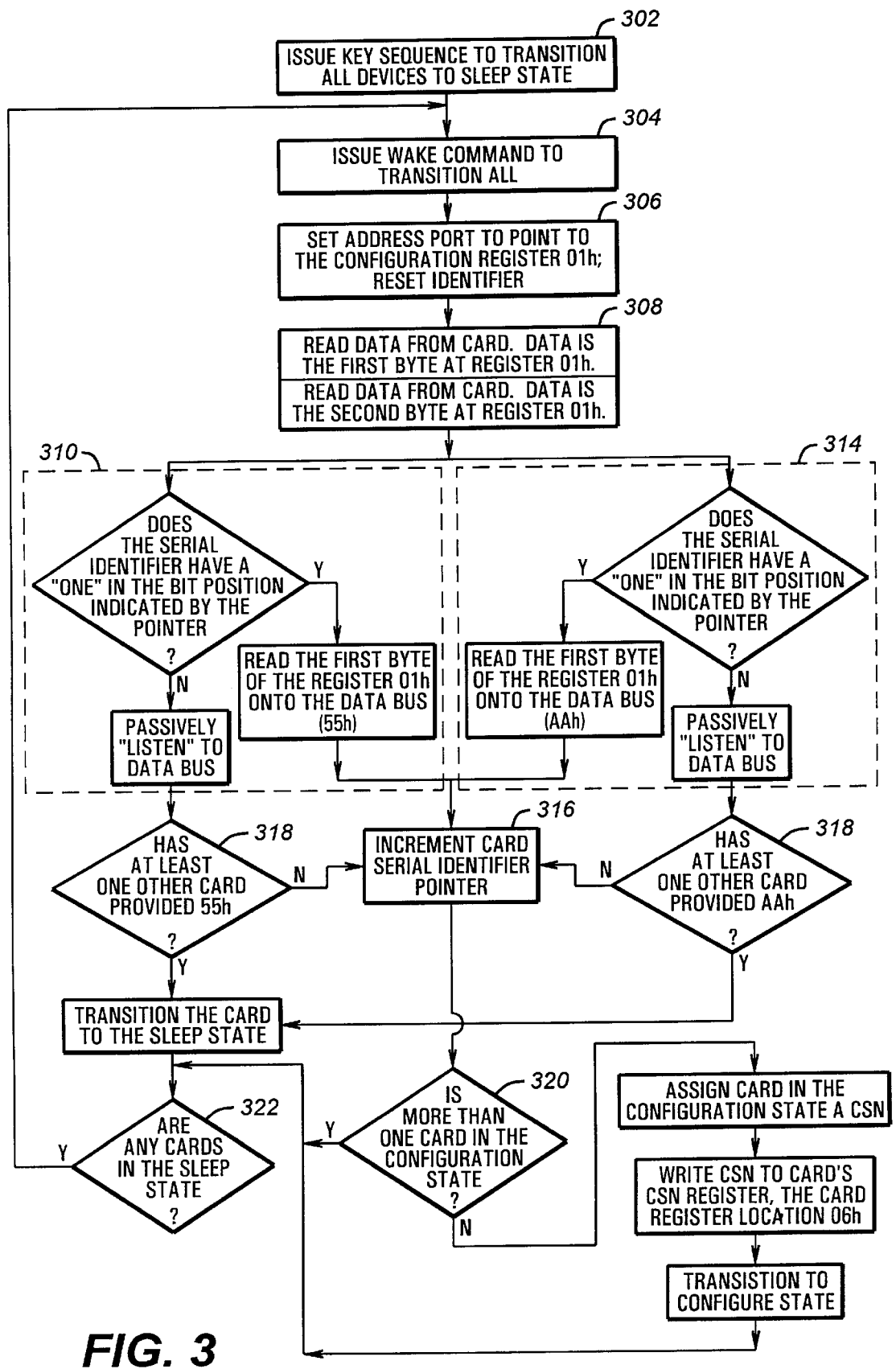
FIG. 3 shows the isolation of Plug-and-Play devices.
Figure 6:
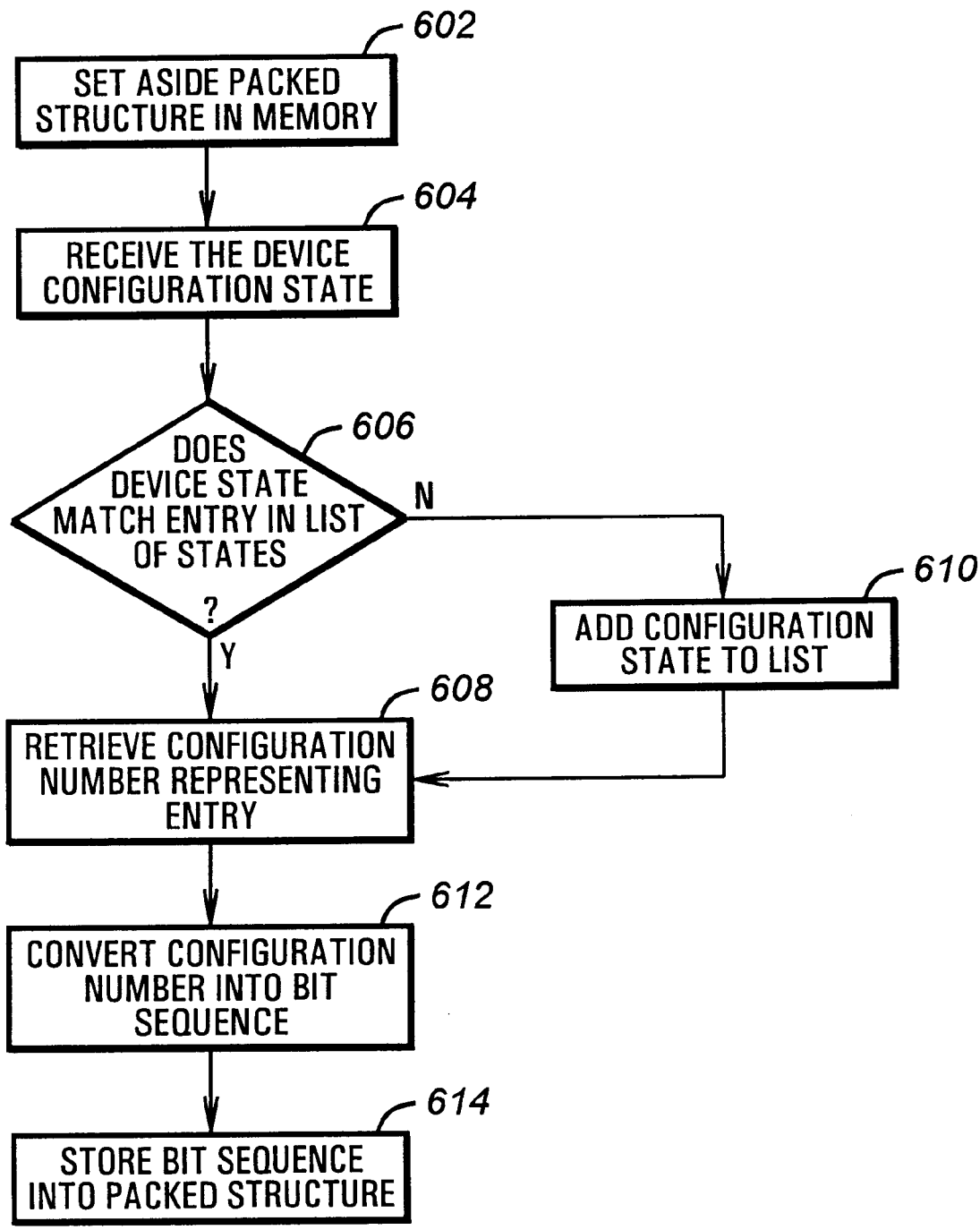
FIG. 6 shows a flowchart representing a method embodiment of the present invention.

Referring now to FIG. 3, to isolate each card and assign a unique CSN to each card, at step 302 the configuration routine (either the BIOS or the operating system) initially transitions all configurable devices to a sleep state by issuing a key sequence. Isolation of Plug-and-Play devices is described to provide a fuller understanding of device configuration. It will be recognized that the ISA paradigm is not directly affected by the invention.

At step 304, the configuration software then issues a wake command with a CSN of 00*h*. This is accomplished by writing a 03*h* to the address port and 00*h* to the write data port of each device in the system. Each card compares the zero value in its 03*h* register (wake command register) with the zero value in its 06*h* register (CSN register), and since all have a compare, all transition to the isolation state. In other words, in response to the wake signal and the CSN of 00*h*, each card lacking a CSN transitions to an isolation state and resets its serial identifer pointer to the first bit of the identifier. However, cards that have a CSN ignore "wake" signals (or transition to the sleep state). Because initially all configurable cards lack a CSN, all cards transition to the isolation state when the "wake" signal is generated. The wake command further resets the bit pointer in the serial isolation register of each awakened card to the first bit.

At step 306, the configuration software sets the address port to the device's configuration register 01*h*. All subsequent read-commands will be addressed to the serial bit identifier of the card. At step 308, a pair of read-commands is issued to all cards in the isolation state in the system. The pair of read commands causes all the cards in the isolation state to provide the first bit of their respective serial bit identifiers as data on the data bus—all cards in the isolation state are read simultaneously. A pair of read commands is needed, since each bit of the serial bit identifier is actually stored as a pair of bytes, with a one-bit being stored as a 55*h*/AAh and a zero-bit being stored as a 00*h*/00*h*. It will be noted that 55*h* terminates in an 01*b*, while AAh terminates in a 10*b*.

At step 310, those cards with a one-bit in the position indicated by the serial identifier pointer returns a 55*h*, but the cards with a zero-bit in the position indicated by the serial identifier pointer do not return any value at all, but rather passively determine whether at least one other card is providing a 55*h*. At step 312, a second read-command is issued to all cards in the system. At step 314, those cards with a one-bit in the position indicated by the serial identifier pointer retuns a AAh, but the cards with a zero-bit in the position indicated by the serial identifier pointer do not return any value at all, but rather passively determine whether at least one other card is providing a AAh. At step 316, those cards with a one-bit in the position indicated by the serial identifier pointer increment the pointer to the next serial identifier position.

At step 318, all zero-bit cards that have passively observed the data bus determine whether at least one other card was observed to provide a 55*h*/AAh as data. This determination is actually accomplished by observed the last two bits on the data bus; a 01*b*/10*b* indicates that at least one other card provided a 55*h*/AAh, while 00*h*/00*h* indicates that all other cards failed to provide data. If at least one other card was observed to provide a 55*h*/AAh as data, all cards having a zero-bit transition back to the sleep state. However, if no other card was observed to provide a 55*h*/AAh as data, then all cards must have a zero-bit in the position indicated by the serial identifier pointer; all remain in the isolation state, and increment the serial identifier pointer to the next serial identifier position.

So long as more than one card remains in the configuration state, at step 320, the configuration software then loops back to step 308, where another pair of read commands is issued by the bus master (the microprocessor). If only one card remains in the configuration state, that card is assigned an 8-bit CSN, which is written to the card's CSN register (location 06*h* in the card's configuration register stack; a "06*h*" is written to the address port and the CSN written to the data port). A device being assigned a non-zero CSN is transitioned to the configure state. At step 322, the configuration software determines whether any cards remain in the sleep state; if so, control loops back to step 304. Cards having a CSN transition to the sleep state, while cards lacking a CSN transition to the isolation state and begin isolation. This is accomplished by writing a 03*h* to the address port and 00*h* to the write data port of each device in the system. Each card compares the value in its 03*h* register (wake command register) with its 06*h* register (CSN register), and those that compare transition to isolation state while those that miscompare transition to the sleep state.

Assuming no contention on the read data port by legacy ISA cards, this process produces a unique CSN for each card in the system. Thereafter, all cards can be kept in the sleep state until needed.

There is a state for cards that have been assigned CSNs: the "configure" state. When a card is needed, it can be transitioned to the configure state by writing 03*h* to the address port and the CSN of the desired card to write data port, writing the desired CSN into the wake command registers of all of the cards. The card with the CSN compare (i.e., the same value in the wake command register and the card select number register) transitions to the configure state, while all of the other cards either remain in or transition to the sleep state.

RESOURCE REQUIREMENTS IDENTIFICATION

Once all the cards have been isolated, the configuration software (the E/ISA bus enumerator program in Windows 95) wakes up each card (transitioning the card from the sleep state to the configuration state), reads its configuration registers, and then returns the card to the sleep state. In this way, the configuration software builds a comprehensive table of all resource requirements in the system.

Reading the configuration registers itself includes a number of steps. The card is placed in the configuration state.

This is accomplished either during the initial assignment of the CSN, in which the card is temporarily placed in the configuration state, or during a subsequent transition by writing the desired CSN in the wake register of all cards. Once the card is in the configuration state, the card resource requirements are read, one byte at a time, in handshake mode (i.e., requiring a data-ready asynchronous signal in the status register). Each card contains a card response data structure identifying the number of devices on the card, and also identifying the resources requirements of each separate device on the card as well as the requirements of the card itself All of these requriements are read from the card and provided into memory during the resource requirements identification phase.

The resource requirements comprise a sequence of devnodes, each containing a list of descriptors. The structure of the devnodes is explained below, with reference to FIG. 9.

As stated above with respect to FIG. 2, and specifically with respect to step 210, a comprehensive list of the resource needs associated with each and every active device is created. Moreover, all the buses in the system are scanned to determine resource requirements for each device on each bus, as well as for devices separated from system buses by bus bridges. Because bus bridges allow external expansion buses to be added to the embedded buses of existing systems, this is hardware-driven process, as buses are detected and scanned. Each device is polled individually to ascertain from the device what resources must be assigned for the device to function. Some devices require specific resources, while others are more flexible.

As stated above with respect to FIG. 2, and specifically with respect to step 210, a comprehensive list of the resource needs associated with each and every active device is created. Moreover, all the buses in the system are scanned to determine resource requirements for each device on each bus, as well as for devices separated from system buses by bus bridges. Because bus bridges allow external expansion buses to be added to the embedded buses of existing systems, this is hardware-driven process, as buses are detected and scanned. Each device is polled individually to ascertain from the device what resources must be assigned for the device to function. Some devices require specific resources, while others are more flexible.

Also, while each card is in the configuration state, each device on the card (if there are multiple devices) is assigned a unique logical device number.

AVAILABLE SYSTEM RESOURCE DETERMINATION

As stated previously, the BIOS is typically developed independently of the system hardware, so that the BIOS is compatible with a variety of hardware devices. However, the BIOS must be platform compatible, so that the BIOS is aware of the system resources available on the system. The BIOS must have access to information about the system itself, the number of motherboard interrupts, the type of peripheral interrupt controller, the overall size of memory, and other systemboard and system resources. This information allows the BIOS to allocate existing resources to the devices as needed.

When a system is designed, the designers include a number of IO devices, such as a keyboard controller, a display controller, a serial port, a parallel port, a video graphics adapter, and other devices as part of standard system configuration. Systems designers also anticipate a set of expected peripherals and plug-ins that will be added to the system. System resources appropriate to the peripherals and plug-ins are included in the motherboard, and the BIOS is designed to accommodate the system resources, the embedded devices, and the peripherals and plug-ins that are likely to be added to the system. During operation, the BIOS routines, in the system ROM shipped with the system, convert microprocessor commands and requests into IO reads and writes that accomplish the request.

Because the BIOS is considered part of the system itself, the BIOS always has a list of available system resources. These resources typically include interrupt requests, IO ranges, and other features accessible to the microprocessor and assignable to the devices. As new products come on the market for which the BIOS is inappropriate, the user may purchase BIOS upgrades from the BIOS developer that will allow the system to configure the new devices. Development of devices, therefore, requires either that devices be configurable by existing configuration software, or that BIOS upgrades be made available so that existing systems can use the new devices.

Also, the BIOS must maintain a number of bus-specific enumerator programs to read configuration registers associated with system buses. The configuration software typically calls the appropriate bus enumerator routine when access to bus is needed. As new buses are added to the system, the BIOS must be upgraded to accommodate the new buses. This further requires system-specific BIOSes.

RESOURCE ALLOCATION

As stated above with reference to FIG. 2, at step 210, a comprehensive list of the resource requirements associated with each and every active device is created. These resource requirements comprise a sequence of devnodes, one of which must be selected by the configuration software. The structure of a device devnode is described below with reference to FIG. 4, but includes a list of descriptors defining alternative resources. FIG. 4A shows the bit-level configuration of the device node attributes field 410. The configuration software determines a set of descriptors defining a permissible nonconflicting resource allocation for a device, and then determines values for the configuration registers of the device. Once the values are determined, all that remains is to copy the values into the proper device on the proper card.

As stated above, the BIOS maintains a list of all of the available system resources. This list is defined by the system motherboard designer, and is part of the BIOS itself. The list of available resources is used in the selection of devnode descriptors, since it is the limited number of system resources that controls the configuration process.

During resource allocation, these lists are compared to determine a nonconflicting resource allocation. The process of determining a nonconflicting resource allocation is limited by the Once the mapping of nonconflicting resources is determined, the resource assignment of each device is written into the configuration registers of the device. This is accomplished by placing each card in the configuration state, selecting the target logical device on the card, and writing the assignment into the appropriate device level register.

As stated previously, each card contains a number of card-level register stacks, including card-level CSN register at register stack location 06h, a wake command register at register stack location 03h, and a Set Read Data Port address register at register stack location 00h. Register stack locations from 00h to 2Fh are used for card-level registers. However, included in the card-level register stacks is the logical device number register ("LDN register"), at register stack location 07h. When the configuration software determines the configuration (i.e., the resource assignment) of a target device, the configuration software transitions the card on which the target device resides into the configuration state by writing the CSN of the desired card into the wake command registers of all the cards in the system. Then, once the desired card is in the configure state and all other cards are in the sleep state, the logical number of the device is stored in the LDN register of the card under configuration.

In addition to the card-level register stacks at locations 00h to 2Fh, each card having multiple device further contains a plurality of device-level register stacks 30h to FFh, storing device configuration status. To configure a particular device, the configuration software writes the logical device number of the target device into the logical device number register (at register stack location 07h). (To write the LDN in the proper stack location, 07h is written to the Set Read Data Port address register and the LDN applied to the data lines.) Once the LSN of the desired logical device is in the LDN register, all subsequent reads and writes to and from register stack locations above 2Fh (i.e., 30h-FFh) provide access to the device-level registers. Although each device has some device control registers, including the activate register, the IO range check register, and some vendor-defined device control registers, most of the device-level registers are device configuration registers.

Once the LDN of the target device is identified and written to the logical device number register, the particular configuration register to be written to is selected. The configuration registers contain programmable memory, programmable IO address decoders, or programmable selectors used to select an interrupt or a DMA channel. To select a particular configuration register, the address of the specific configuration register under configuration is written to the configuration address port IO location 0279h (and 0A79h). Subsequent access to the read data or write data port accesses the register having the address stored in location 0279h. (Actually, six bits of the location 0279h, all 8 bits of location 0A79h, and two additional bits hardwared to zero determined the address of the configuration register being addressed.)

Because device configuration registers are vendor-defined, some complying with the ISA specification and others with the PCI specification, for example, different devices have different addressing of configuration register locations. However, some of the configuration registers have common bit definitions. For example, certain bits define whether the device is an ISA device, whether it can perform as an 8-bit, 16-bit, or 23-bit device.

Referring again to FIG. 2, at step 212, conflict free resources are allocated to any devices in the system that may have been configured according to the configuration routine of the BIOS. All devices are assigned conflict free resources, although none of the devices are activated until the allocation process is completed. At step 214, the POST software assigns resources to each configurable device, avoiding resource conflicts and further avoiding assigning predetermined and embedded resource allocations consumed by legacy and embedded devices using fixed resources. This assignment of resources is referred to as configuration, and can be complex, particularly if several identical devices are included in the system, if devices require specific scarce resources, or if the system does not include sufficient compatible resources. Any devices determined to be enabled by the POST are then activated, and any Plug-and-Play device ROMs associated with the devices is called as initialization code and executed.

Configuration of the system then proceeds. While configuring the devices, the POST also generates an allocation map, representing the allocation of IO space and resources in a tabular form within memory. The memory used may be a volatile RAM, a non-volatile PROM, or a ROM shadowed in RAM. The latter is the more common and more useful, since it allows a dynamic RAM configuration that can be changed by software and applied to the current session, while also allowing a static PROM to be written, to create a default boot-up configuration for the next session. The entire allocation is represented in the allocation map and conflicts checked, before actually providing the resource-allocations to the devices. At step 216, the POST verifies the resource allocation map, but does not activate the devices.

At step 218, the POST attempts to deactivate input and output devices, or ensure that the input and output devices are disabled. The POST then verifies that input and output devices are disabled. Any device that cannot be disabled is then allocated as an input or output device for use during the boot process. For example, ISA based VGA display adapters cannot be disabled. The POST then determines whether additional input and output devices are necessary to boot an operating system. Depending on whether the operating system is a Plug-and-Play operating system or is not, the POST then determines whether to enable additional devices. Any devices determined to be enabled by the POST are then activated, and any Plug-and-Play device ROMs associated with the devices is called as initialization code and executed.

The configuration of each device is written to the device, and stored in a device configuration register. The Plug-and-Play ROM's initialization routine reads the device configuration register of each device in the system to determine the base IO address assigned to the device register set by the configuration software. Once the base IO address is known, a series of IO rights to the device register set may be performed to set the device up for normal operation. However, an interrupt ribbon Plug-and-Play device with programmable interrupt line selection and a device specific interrupt service routine in the ROM, the device initialization code writes the start address of the interrupt service routine into the appropriate interrupt table entry; the ROM based initialization routine therefore its device configuration registers and determines which interrupt line has been assigned to its device.

At step 220, all devices in the system are activated. Any devices thus activated having option ROMs but have not been initialized, are initialized according to the option ROM. A double check is performed to determine whether any Plug-and-Play ISA devices have been activated but not initialized, and if any such ISA devices are found and have option ROMs corresponding thereto, the option ROMs are red for initialization code which is then executed. All devices in the system are checked for device ROMs and are initialized from the device ROMs. The device ROM is synonymous with the option ROM.

Referring again to FIG. 2, the POST boots the operating system, typically from a system ROM. At step 222, the BIOS POST executes an "INT 19h" instruction, performing the bootstrap loader program that attempts to read the operating system into memory.

At step 224, the software selects an operating system, and prepares to boot the selected operating system. If the particular operating system to be booted is plug-and-play compatible and the IPL ("initial program load") devices are configured, then the operating system is booted. The POST BIOS typically only configures the mass storage device in which the operating system resides, and may additionally enable an input and output device. Otherwise, additional devices necessary for the particular operating system may be required to be activated; the BIOS POST activates and enables every device in the system. At step 226, the operating system is booted and obtains control of the machine.

Referring again to FIG. 2, the POST boots the operating system, typically from a system ROM. At step 222, the BIOS POST executes an "INT 19h" instruction, performing the bootstrap loader program that attempts to read the operating system into memory.

STRUCTURE OF A DEVNODE

Referring now to FIG. 4, and to FIG. 4A, the structure of a devnode is shown. The devnode is a data structure defining the configuration of a device (typically, an embedded device) created by the BIOS and left in memory for the operating system to use or access to determine the nature of the hardware configuration, and, in more modern operating systems, to perform hardware reconfiguration. The devnodes typically describe embedded system board devices, including interrupt controller, the DMA controller, the keyboard controller, the floppy disk controller, the system board timers, and an integrated video controller, and other devices as well. These devices may or may not be configurable, and may or may not include expansion devices on expansion buses or peripherals connected to system board devices.

The first two bytes of a devnode are the size field 402, representing in bytes the length of the data structure. Because the devnode can be more than 256 bytes in length, two bytes are needed to describe the size of the devnode. Following the size bytes, a device node number 404 is included. The device node number 404, or handle, is a one-byte long descriptor that is unique among the devices on the system. Each device has a unique handle, so that the microprocessor can identify the device for messages between the device and the microprocessor, and also allows the OS to identify the node to the BIOS routines.

Following the device node number 404, a 4-byte device product ID 406 is included. If the device complies with the EISA specification, the device product ID 406 is the EISA ID: the first two bytes of the EISA ID are the product reference, and the last two bytes of the EISA ID are the product number (12-bits) and the version number (4-bits). Following the device product ID 406, the device type code 408 is included. The device type code 408 is 3 bytes, identifying the PCI class code. If the operating system cannot find and load a driver for the device, the operating system attempts to load any other driver it can find that would be appropriate for any other device having an identical PCI class code.

Following the PCI class code or device type code 408, a two-byte device node attributes field 410 provides information detailing whether the device may be disabled, configured, or is to be used in booting the operating system. The devices to be used in booting the operating system are the primary input, output, and IPL device. The device nodes attributes field is shown in more detail in FIG. 4A. The device node attributes field 410 also includes bits indicated whether the device is a docking station, whether the device is removable, and whether changes made to the device configuration are dynamic (taking effect immediately) or static (requiring reboot before taking effect). Following the device node attributes field 410, three substructures of indeterminate length contain lists of allocated resources 412, possible resources 414, and compatible devices 416.

The two bytes of the device node attributes field 410, described in reference to FIG. 4, is also shown in greater detail in FIG. 4A. In keeping with both the EISA and Plug and Play specifications, the first seven bits (bits [15:9]) are always zero. Bits [8:7] indicate whether the device is configurable statically and dynamically. As indicated above, static reconfiguration is not implemented until the next time the computer system is booted, whereas dynamic configuration occurs immediately. Bits [6:5] indicate whether the device is removable and whether the device is a docking station. Many modern systems allow "host docking" of component devices even while an application is running, and some also allow dynamic configuration of docked devices. Bits [4:2] indicate whether the device can be used to boot an operating system. Bits [1:0] indicate whether the device can be configured and disabled.

It should be understood that the substructures can be quite long. The list of allocated resources 412 contains a large number of descriptors. Moreover, each descriptor can be up to 8 bytes (short descriptor) or 64K+3 bytes (large descriptor) in length. Each descriptor in a list requires a byte to define the descriptor type (IRQ, DMA channel, IO port, etc.) and large descriptors require additional bytes to define their length. Other bytes are needed to define the resource described (IRQ0, DMA channel #2, etc.) Large descriptors require several bytes, e.g. to define memory ranges or identifier strings. Other bytes may map the descriptor to a particular configuration register. Several descriptors are necessary to define a single configuration state. Furthermore, not only is the list of allocated resources 412 potentially long, but the list of possible resources 414 contains not one but many such configurations.

The list of compatible devices 416 contains a list of EISA ID's, each four bytes long, that end with the end tag. The first byte is always 0011100b, identifying the EISA ID as such. The next three bytes are the first 32 bits of a card's serial ID, identifying the vendor and the product ID for each and every possible device having a driver that can be used in conjunction with this device.

The lists of allocated resources 412 and possible resources 414 typically include descriptors for compatible devices, interrupts, DMA channels, IO address space, and memory requirements, as well as vendor-specified resources; the list ends in an "end" tag. Each configuration state of the device is a set of resource allocations identifiable as a combination of the entries in these lists. The device can be placed in any one of the configuration states when the configuration process configures the device, selecting one of the various combinations of the resources.

Each resource in the list of allocated resources 414 and possible resources 416 can be quite long. Each "resource" in these lists actually a descriptor identifying an interrupt, DMA channel, or IO space allocation that the device can use. The list of allocated resources, like the list of possible resources, is actually a list of these descriptors. However, each of these descriptors can be up to 64K+3 individual bytes long; the first byte of a descriptor identifying its length, the second byte identifying the descriptor type, and the remaining bytes providing values for the descriptor.

Various descriptors are now described in more detail. The interrupt descriptor identifies which of the system interrupts the devices on the card can use, and also indicate whether the device uses the interrupt type (i.e., positive-edge, etc.) The DMA descriptor may indicate either one or two DMA channels, whether Type-A or Type-F transfer is supported, whether count-byword or count-by-byte mode is supported, and whether the device prefers 8- or 16-bit transfers. The IO address space descriptors include descriptor for each of a number of programmable IO address decoders, how wide an address range is supported, and the overall address range where the device is located. Also, the ROM itself is specified, if the device includes an option ROM.

The resource data structure also may contain additional descriptors to vendor-specified resources required by the device. Each descriptor is at least two bytes in length, and may be up to 64K+3 bytes in length for exceptionally large descriptors. As can be seen, the resource data structure requires a large number of bytes. The logical device ID descriptor is always provided first.

EMBEDDED SYSTEM BOARD DEVICE NODES CAN REQUIRE A LARGE AMOUNT OF CONFIGURATION DATA

Each card contains a number of registers associated with the card, and also a number of registers associated with each device on the card. Registers associated with the card include: the CSN register, written-to during the isolation process; a set of resource data registers, containing a resource data structure used during the configuration process; and a logical device number register, written to each time the device is to be accessed (whether during configuration or during run-time). Registers associated with the device include device configuration registers, written-to during the configuration process identifying resources assigned to the device, as well as vendor-defined registers.

The resource data structure defines all of the resources required by all of the devices on the card. A card may contain more than one device. The card's logical device number register, typically an 8-bit read/write register, is part of the card's resource data structure, and allows up to 256 devices per card. Configuration involves reading card-level registers, including the resource data structure, and writing resource assignments to the device-level configuration registers. Writing values into the logical device number register transitions the card from one device to another, much like changing modes. Thereafter, and until a new logical device number is written into the logical device number register, all subsequent accesses to the card access the particular device.

Configuration locations $00h$-2Fh are card-level registers, while locations $30h$-FFh are device-level registers. Each device can have up to 16 registers. Card-level registers can be used to command isolation states of the devices on the card, and can select particular devices.

As can be seen, the card contains a large number of registers. Both card configuration, and device configuration, require a number of registers. The device's configuration registers must be numerous enough to contain identifiers to the I/O memory range, interrupt line, DMA channel, and other resources assigned to the device.

In addition to the registers, the card may also contain a memory, typically an option ROM, containing the card's initialization code and the resource data structure, typically in a slow-access device such as a device option ROM. The resource data structure on the card contains a card version number, a resource requirement list of all of the devices on the card, and (once configured) a logical device number and configuration assignment for each device. The resource data structure contains a plurality of descriptors identifying resource requirements required by the various devices on the card. Each device descriptor is associated with a configuration register, wherein the BIOS can write the resource assignment determined during the configuration process. The logical device ID descriptor is always provided first.

With respect to standard resources, the card's resource data structure also contains an interrupt, DMA, and IO space descriptor. The interrupt descriptor identifies which of the system interrupts the devices on the card can use, and also indicate whether the device uses the interrupt type (i.e., positive-edge, etc.) The DMA descriptor may indicate either one or two DMA channels, whether Type-A or Type-F transfer is supported, whether count-by-word or count-by-byte mode is supported, and whether the device prefers 8- or 16-bit transfers. The IO address space descriptors include descriptor for each of a number of programmable IO address decoders, how wide an address range is supported, and the overall address range where the device is located. Also, the ROM itself is specified, if the device includes an option ROM. The resource data structure also may contain additional descriptors to vendor-specified resources required by the device. Each descriptor is at least two bytes in length, and may be up to 64K+3 bytes in length for exceptionally large descriptors. As can be seen, the resource data structure requires a large number of bytes.

Embedded devices, whether or not configurable, also include data structures identifying resources used by the devices that provide basic system board services. Embedded devices typically include an interrupt controller, a DMA controller, a keyboard controller, a floppy disk controller, system board timers, an integrated video controller, and other devices commonly found in computer systems and typically mounted on the motherboard. The nodes (configuration data structures) for these devices are also configured by the BIOS, and are generally reconfigurable by the operating system. An assignable resource list is provided by the vendor, typically in the option ROM or a configuration file, or sometimes in the node data structure itself, and allows the configuration process to configure the device and store the configuration in the devnode. If the vendor has supplied a device node in multiple sources, the configuration file will be preferred (being considered more recent). The system device node typically contains at least 15 bytes of information pertaining to the device. Various substructures of variable length within the node can optionally be included to define the resource currently allocated to the device, possible alternative resources that may be allocated to the device, and a list of type-ID's for compatible devices. A compatible device is a device whose driver can be used if a driver for a given device cannot be found. The first two bytes of the node indicate the overall length of the node, in bytes; the node can be extensive.

Again, it can be seen that the number of registers associated with the devices in the Plug-and-Play methodology can be quite large.

BOOTING THE OPERATING SYSTEM IS A ROTE PROCESS

Booting the operating system is also straightforward. Any device that comes up in the enabled state and cannot be disabled, and uses fixed resources, is used by the POST to boot the operating system. If no such device exists, the POST examines the device indicator button in the Plug-and-Play device ROM header for each device to determine whether the configurable device can be used to boot the operating system. If no device that may serve as an initial program load device comes up in the enabled state, and cannot be disabled, and uses fixed resources, then the POST searches devices using the device indicator bit in the Plug-and-Play device ROM header and the device is configurable and can be used to boot the operating system, then the POST configures in and enables the boot device to boot the operating system.

If the device has a Plug-and-Play ROM or an ISA device ROM, the POST calls the initialization routine within the device or the boot connection routine within the device, which hooks the appropriate entry in the interrupt table to the device specific interrupt service routine within the ROM. The POST then executes an INT $19h$ to call the boot strap letter routine. The device may be a network interface controller, allowing the boot-up device to be located at a remote location.

THE OPERATING SYSTEM GENERALLY CALLS THE BIOS ROUTINES LEFT IN MEMORY

Many operating system rely on BIOS routines left in memory. The operating system may rely on Plug-and-Play BIOS services, or may contain its own hardware platform interface routines, for example the HAL in Windows NT. The operating system seeking a BIOS routine typically scans at the memory area from F0000h through FFFFFh, looking for "$Plug-and-Play" starting in an address visible by 16. The 4-bit long string thus searched, when found, comprises the first four bits of the 33-bit Plug-and-Play BIO support installation check data structure. At step 1204, the operating system performs a check sum to insure that the structure is not corrupted. The structure contains information about the BIOS generally, and contains the entry point to the BIOS, identifying the data segment containing the Plug-and-Play BIOS' data area to permit the BIOS access to the variables in the data area.

PACKING AND UNPACKING OF CODED DEVNODES ACCORDING TO THE EXEMPLARY EMBODIMENT OF THE PRESENT INVENTION

The Plug-and-Play BIOS function 00h, "Get Number of System Device Nodes", supplies the operating system with a total number of embedded system board device nodes, and the size of the largest of the device nodes in bits. These are called every time the hardware configuration of the system changes. The BIOS allows dynamic configuration, altering the contents of the configuration registers, or static configuration, altering the non-volatile memory associated with each device. Using the maximum device node size returned in response to function 00h, a region in memory associated with each device is then filled with the device node data structure from the device in response to the function 01h. This region in memory is known as the device node buffer, or devnode buffer. Depending on arguments passed from the operating system to the BIOS, the device node returns either its static or its dynamic configuration. Function 02h allows the system to update the configuration of the device, either statically or dynamically, depending on the parameters passed from the OS to the BIOS.

Most Plug-and-Play BIOS packages include support for run time changes in the system configuration. Whether by polling, interrupt, or event, the BIOS supports a variety of operating system functions.

Function 40h, when passed to a Plug-and-Play BIOS, creates a Plug-and-Play EISA configuration table in memory by obtaining the total number of CSNs assigned to all the Plug-and-Play EISA cards and the IO address of the Plug-and-Play configuration read data port. It is this configuration table that enables the operating system to ascertain and manipulate the configuration of the cards on the bus. The extended system configuration data (ESCD) defines a method for storing configuration information in non-volatile memory, and various functions for accessing the information. EISA card configuration is stored only as to the primary, not alternative, resource allocation. However, the ESCD BIOS functions complement the EISA BIOS functions, allowing automatic EISA card configuration much like PCI and ISA devices.

Typically, the system ROM initializes the on-board devices into phases. The first phase initializes the hardware, with its own code of examining or manipulating the hardware and the CMOS layout associated with the hardware. The second phase initializes the Plug-and-Play BIOS by reading the hardware state and the CMOS associated with the hardware. This two-phase approach comprises the old method. Due to the complexity of separate initialization phases, and the need to develop both the hardware phase and the ROM BIOS phase each time a new product is introduced in the market, programming errors may be introduced, risking misconfiguration of two conflicting devices or conflict detection where there is no conflict.

THE NVS ABSTRACTION

As indicated above, prior systems typically have stored entire memory range addresses in IO descriptors, and provided a dedicated register to define the DMA channel used (although only 4 are available). The vendor-defined 32-bit field that follows the manufacturer's ID in the serial identification number is stored and retained, even after the card serial number is determined. Reserved bits, bits tied to zero or to one, and redundancy are built into the system. Many registers are typcially dedicated to individual descriptors, although the data in the registers may not comprise 8 bits of information.

In the typical interrupt configuration register, for example, use two register pairs (interrupt configuration registers 0 and 1) to store the configuration interrupt assignment. Register stack locations 70h and 71h are used to store the configuration interrupt assignment of the first interrupt. Bits [7:4] of register stack location 70h are reserved, while bits [3:0] are used to select a system IRQ line, while 00h pk indicates no IRQ has been assigned. Bits [7:2] of register stack location 71h are reserved, and bits [1:0] define the manner of transition (00b indicates high-to-low, 01b indicates active low/level sensitive, 10b indicates low-to-high, and 11b indicates active high/level sensitive). Register stack locations 72h and 73h are used to store the configuration interrupt assignment of the second interrupt. Bits [7:4] of register stack 72h are reserved, while bits [3:0] are used to select a system IRQ line, while 00h indicates no IRQ has been assigned. Bits [7:2] of register stack location 73h are reserved, and bits [1:0] define the manner of transition (00b indicates high-to-low, 01b indicates active low/level sensitive, 10b indicates low-to-high, and 11b indicates active high/level sensitive). Thus, in the four 8-bit registers (totalling 32 bits) used to store the configuration assignment of the interrupt request lines, 20 bits are reserved, and the remaining 12 bits are used to store a relatively small amount of configuration data; yet four registers are reserved.

As a further example, DMA channel configuration allows assignment of up to two system DMA channels, reserving two DMA configuration rgisters (DMA configuration registers 0 and 1). Because channel four is not available for selection because itis used to cascade the slave DMA controller through the master DMA controller, the selection of possible channels is further limited. Register stack location 74h, the DMA configuratiojn register 0, has bits [7:3] reserved, while bits [2:0] define the first DMA channel. Register stack location 74h, the DMA configuratiojn register 0, has bits [7:3] reserved, while bits [2:0] define the first DMA channel. Register stack location 75h, the DMA configuratiojn register 1, has bits [7:3] reserved, while bits [2:0] define the second DMA channel. Register stack location 74h, the DMA configuratiojn register 0, has bits [7:3] reserved, while bits [2:0] define the first DMA channel. A value of 04h in either of registers indicates that no DMA channel has been selected. Configuration locations A9h-EFh and FFh are all reserved for additional future device-oriented configuration registers and must not be used. Locations F0h-FEh are available and are reserved for DMA configuration registers, but remain empty unless used by the vendor specification.

Even though several devices in the system may be of the same type, and therefore have identical compatible device ID lists, each device retains a full definition of the device's compatible device list.

Moreover, the devnodes themselves contain redundancies and reservations that allow for added flexibility that in the present invention is retained in the present invention by other means. The typical Plug-and-Play device resource descriptor in a devnode is associated with a corresponding configuration register, and vice versa. Each card's resource data structure contains a separate resource requirement list, having a potentially large number of dsscriptors, for each device on the card.

As indicated above, descriptors for compatible device ID's, for example, are in the form of a list of full eight bytes. Of the eight bytes, four contain the 4-byte (32-bit) serial ID, one byte indicates that the desriptor is small or large, and three bytes indicate the length of the descriptor. The 32-bit (4-byte) serial ID is used as a device ID, descriptor includes in bits [2:1] the size of the compatible device ID, Each device's interrupt descriptors and DMA descriptors, likewise, require several bytes of configuration data.

The IO address space descriptors, up to eight in number, each defines whether a full 16-bit decode or only a 10-bit ISA IO decode is performed, the size of the IO range, the overall address range within which the device must be located, and the alignment for the base address of the assigned range. Devices that have only an IO register set in the resource data structure store the lowest and highest IO base addresses that may be assigned to the device, and the number of IO addresses required.

Memory descriptors, up to four for each device, each identify whether the memory is a RAM, a shadowable-ROM, or an unshadowable-ROM; whether it is an 8-bit, 16-bit, or 32-bit memory; whether the effective size of the memory may be programmed; whether the size of the memory is defined by a range length or an end address; and whether the memory id cacheable.

Vendor-defined resource descriptors are also common. Each of the descriptors is either large or small, and can range from two to 64K+3 bytes in length (small descriptors can be from two to eight bytes, and large descriptors can be four to 64K+3 bytes long).

All of the aforementioned descriptors must be stored in nonvolatile memory, requiring a large amount of nonvolatile memory simply to store the configuration descriptors. When the firmware is added to the nonvolatile storage as well, the burden on the NVS (nonvolatile storage) memory can be quite large. This limits the flexibility of the system to accommodate addtional BIOS and operating system routines.

In addition to the NVS devices (typically ROMs), the active memory associated with each device is also burdened. Many configuration registers use far more space than minimally necessary. Registers are resreved for future vendor definition or are reserved for vuture versions of the configuration software. While the exemplary embodiment of the present invention retains these registers and can use them in a future implementation, the exemplary embodiment of the present invention adapts the collection of configuration registers to the requirements of the system in which it is included, reducing the amount of storage space required.

Much of the redundancy is built into the system for backward-compatibility reasons, but is not minimally necessary for operation of the system once the system configuration processes have completed.

Referring now to FIGS. 5A–5C, the systemboard Plug-and-Play and NVS abstraction is shown. The NVS abstraction takes advantage of several key observations: first, that many devices have redundant information, such as several devices having the same vendor ID's (being manufactured by the same vendor); and second, that entire dedicated registers are not needed for each small amount of information, since much of the information stored in the system ROM can be compressed.

Referring now to FIG. 4B, an example of devnode resources is shown. In the example, devnode resources are defined as in terms of the independent resources, then the dependent functions, then the dependent resources. In other words, the ordering proiority moves from least significant to most significant. First, the independent resources are defined. The device corresponding to the devnode can be assigned either IRQ 5 or IRQ 7, as indicated in the IRQTAG field 552. The device corresponding to the devnode can be assigned either DMA 1 or DMA 3, as indicated in the DMATAG field 554. Then, the dependent functions are defined 556. The device corresponding to the devnode can be assigned either Port and memory addresses as shown in the allocation 558, or the devnode can be assigned either Port and memory addresses as shown in the allocation 560. If any dependent resources are allocation, such are defined after the dependent functions.

Initially, the number devices and the number of possible states each device may assume is determined. For example, a device may have requirements specified for an IO range, a DMA channel, and an interrupt request. The device may be configurable to any of three IO ranges, either of 2 DMA channels, and any of the first 16 interrupt request lines. In total, therefore, the device may be configurable to any of 96 possible states (3×2×16), for example. If any choices are mutually exclusive, the number of states is reduced. Each of these states is listed in the second partition 520. If each state requires 32 bytes to describe the devnode, then the second partition 520 has 32×96 bytes corresponding to the particular device.

Assume, for example, the devnode resources are indicated in FIG. 4B. Referring to FIG. 5B, shown are the possible configurations that the devnode of FIG. 4B can assume. As can be seen, there are 24 possible configurations. Note that the possible configurations of FIG. 5B are not actually stored as a table, but are rather derived from the devnode resources listed in FIG. 4B. If, for example, the devnode of FIG. 4B could choose between three IRQs rather than two, the table of FIG. 5B would include twelve more entries.

Given the devnode resources of FIGS. 4B and 5B, the corresponding actual configuration is stored in the system non-volatile memory as illustrated in FIG. 5A. The CMOS layout of FIG. 5A is actually defined by a table within the BIOS itself, illustrated in FIG. 5C. As can be seen, the table of FIG. 5C specifies that the first device of the system requires six bits to represent its maximum configuration number. This would correspond to 63 possible configurations (the configuration number minus one is reserved for a disabled device). Following the specification that six bits are necessary, the ROM indicates the default configuration number for device 1. This is defined to be "011001b," or configuration 25. Proceeding to device 2, two configuration bits are provided, sufficient for a device that would have a maximum number of configurations of three. Similarly, device 3 requires four bits to hold its maximum configuration number, device 4 requires three bits, and device 5 requires two bits. Of note, the default configuration for device 4 is "111b" or −1, so that device is by default disabled.

Given the definitions of the table of FIG. 5C, the actual device configurations stored in CMOS are shown in FIG.

5A. As can be seen, six bits are dedicated to device 1, followed by two bits for device 2, four bits for device 3, three bits for device 4, and two bits for device 5. Thus, the configuration information is packed into a smaller number than would be otherwise needed if a fixed number of bits were allocated for storage of each device's configuration.

Given a particular device configuration, it is necessary first to encode the configuration number given that configuration. Assume, for example, that the device of FIG. 4B is to be configured for IRQ 5, DMA 1, port range 278$h$-27$f$, and memory range 1000$h$. Referring to FIG. 5B, this corresponds to configuration 0. To encode this configuration, an RPnPEncodeDevnode routine is called. This is produced below as source code. Given the maximum number of independent resources, a maximum number of dependent resources, and a maximum number of dependent functions, the RPnPEncodeDevnode routine generates an appropriate configuration number. This configuration number is then stored within the allocated bits for that particular device, as illustrated in FIG. 5A. Then, to determine a stored configuration, those bits are decoded by an RPpnPDecodeDevnode routine, which correspondingly extracts the devnode resources of FIG. 4B given a particular configuration number.

By storing the present configuration of devices by configuration number, and by determining a maximum number of possible configurations, the configuration data can be packed into a lesser number of bits than would otherwise be possible. For a device with lesser numbers of configurations, fewer bits are required for storing the actual configuration. In this way, CMOS memory is conserved.

The foregoing disclosure and description of the invention are illustrative and explanatory thereof, and various changes in the details of the illustrated apparatus and construction and method of operation may be made without departing from the spirit of the invention.

What is claimed is:

1. A system comprising:

a processor;

a mass storage device, coupled to the processor;

a BIOS, the BIOS including a structure defining a packed structure in a nonvolatile memory; and the non-volatile memory, each entry in the packed structure including a reduced number of bits sufficient to encode a configuration number that corresponds to a device's configuration state, the reduced number of bits being consecutively packed, wherein the number of configuration states and the number of bits necessary to store the configuration number depend on the number of potential configurations the device can assume.

2. The computer system of claim 1, wherein the reduced number of bits and the configuration number are stored in the non-volatile memory.

3. The system of claim 1, wherein the BIOS further comprises instructions that when executed by the processor in the computer system encode and store the configuration of at least one device in the system.

4. The system of claim 1, wherein the BIOS further comprises instructions that when executed by the processor in the computer system decode the configuration of at least one device in the computer system.

5. The system of claim 3, wherein:

the encode routine includes code for:

(a) a determination of the configuration state of the device, and (b) a comparison of the configuration state of the device with an ordered list of possible configuration states, and (c) a determination of a configuration number corresponding to the state in the list identifying the device state, and (d) the reduced number of bits corresponding to the number.

6. The system of claim 4, wherein the decode routine includes code for:

a determination of the configuration number corresponding to the reduced number of bits;

a determination of the configuration state in an ordered list of possible configuration states corresponding to the configuration number.

7. The system of claim 5, wherein the ordered list stores descriptors for possible configuration states of the device and storing the independent resources, dependent functions, and dependent resources of the configuration state.

8. The system of claim 6, wherein the BIOS further includes instructions that when executed by the processor perform static reconfiguration of the system.

9. The system of claim 6, wherein the BIOS further includes instructions that when executed by the processor perform dynamic reconfiguration of the system.

10. The system of claim 7, wherein the descriptors are defined, within each possible configuration state, in the order of: independent resources, then dependent functions, then dependent resources.

11. The method of claim 7, further comprising the step of configuring the device according to the devnode.

12. In a system comprising a processor, a mass storage device coupled to the processor, and a BIOS within a nonvolatile memory, a method comprising the steps of:

defining a packed structure in the memory, each entry in the packed structure including a reduced number of bits sufficient to encode a configuration number that corresponds to a device's configuration state, the reduced number of bits being consecutively packed, wherein the number of configuration states and the number of bits necessary to store the configuration number depend on the number of potential configurations the device can assume.

13. The method of claim 12, further comprising the step of storing the reduced number of bits the configuration number, and the potential configurations.

14. The method of claim 12, further comprising the steps of encoding and storing the configuration of at least one device in the system.

15. The method of claim 12, further comprising the step of:

decoding the configuration of at least one device in the computer system.

16. The method of claim 14, further comprising the steps of:

(a) determining of the configuration state of the device, and (b) comparing of the configuration state of the device with an ordered list of possible configuration states, and (c) determining of a configuration number corresponding to the state in the list identifying the device state, wherein the reduced number of bits corresponding to the number.

17. The method of claim 15, wherein the perform a step of decoding includes:

determining the configuration number corresponding to the reduced number of bits; and determining the configuration state in an ordered list of possible configuration states corresponding to the configuration number.

18. The method of claim 16, wherein the ordered list stores descriptors for possible configuration states of the device and stores the independent resources, dependent functions, and dependent resources of the configuration state.

19. The method of claim 17, further comprising a step of performing a static reconfiguration of the system.

20. The method of claim 17, further comprising a step of performing a synamic reconfiguration of the system.

21. The method of claim 18, wherein the descriptors are stored, within each possible configuration state, in the order of: independent resources, then dependent functions, then dependent resources.

22. In a system comprising a processor and a mass storage device coupled to the processor, a BIOS within a nonvolatile memory, the BIOS comprising:
a structure defining a packed structure in the memory, each entry in the packed structure includes a reduced number of bits sufficient to encode a configuration number that corresponds to a device's configuration state, the reduced number of bits being consecutively packed, wherein the number of configuration states and the number of bits necessary to store the configuration number depend on the number of potential configurations the device can assume.

23. The computer BIOS of claim 22, wherein the reduced number of bits, the configuration number and the potential configurations are stored in the NV memory.

24. The BIOS of claim 22, wherein the BIOS further comprises instructions that when executed by the processor in the computer system encode and store the configuration of at least one device in the system.

25. The BIOS of claim 22, wherein the BIOS further comprises instructions that when executed by the processor in the computer system decode the configuration of at least one device in the computer system.

26. The BIOS of claim 24, wherein:
the encode route includes code for:
(a) a determination of the configuration state of the device, and
(b) a comparison of the configuration state of the device with an ordered list of possible configuration states, and
(c) a determination of a configuration number corresponding to the state in the list identifying the device state, and
(d) the reduced number of bits corresponding to the number.

27. The BIOS of claim 25, wherein the decode includes:
a determination of the configuration number corresponding to the reduced number of bits;
a determination of the configuration state in an ordered list of possible configuration states corresponding to the configuration number.

28. The BIOS of claim 26, wherein the ordered list stores descriptors for possible configuration states of the device and stores the independent resources, dependent functions, and dependent resources of the configuration state.

29. The BIOS of claim 27, wherein the BIOS further includes instructions that when executed by the processor perform static reconfiguration of the system.

30. The BIOS of claim 27, wherein the BIOS further includes instructions that when executed by the processor perform dynamic reconfiguration of the system.

31. The BIOS of claim 28, wherein the descriptors are defined, within each possible configuration state, in the order of: independent resources, then dependent functions, then dependent resources.

32. A computer system comprising:
a processor;
a plurality of devices coupled to said processor; and
a memory, the memory containing a first data structure and a second data structure, at least one device having a bit sequence representing an integer in the first data structure corresponding thereto, the device further having an ordered plurality of alternative devnodes in the second data structure corresponding to the device, the integer for selecting a devnode from the plurality of devnodes corresponding to the device, each alternative devnode representing a possible configuration state for the device.

33. The computer system of claim 32 further comprising at least one resource, the resource being of a resource type, wherein the device further has at least one configuration register corresponding thereto for storing at least one descriptor of a devnode, the descriptor corresponding to the resource type and to the devnode and to the device, such that when the computer system configures the device, the descriptor defines the allocation of the resource to the device according to the devnode.

34. In a computer system having at least one configurable device and further having a memory, a method of storing the configuration state of a device, said method comprising the steps of:
determining whether a data structure exists in the memory corresponding to configuration states of devices;
if the data structure does not exist, creating the data structure;
if the data structure exists, determining whether the data structure contains at least two regions, including a first and second region, corresponding to the device;
if the data structure does not contain at least two regions corresponding to the device, allocate additional memory such that the data structure contains at least two regions including a first and second region corresponding to the device;
determining whether the second region contains a devnode corresponding to the current configuration state of the device;
if the second region does not contain a devnode corresponding to the current configuration state of the device, adding a devnode corresponding to the current configuration state of the device to the second region;
among the devnodes in the second region corresponding to the device, determining an ordinal number identifying the current configuration state of the device;
converting the ordinal number into a sequence of bits;
determining the number of devnodes in the second region corresponding to the device;
if the first region corresponding to the device does not have allocated sufficient memory to accommodate the sequence of bits, allocating additional memory to the first region sufficient memory to accommodate the sequence of bits; and
writing to the first region the sequence of bits.

35. The method of claim 34, wherein the number of bits in the first region corresponding to the device is minimally sufficient to accommodate the number of devnodes in the second region corresponding to the device.

36. In a computer system having at least one configurable device and further having a memory, a method of recalling a programmed configuration state of a device, said method comprising the steps of:

if a data structure exists in the memory corresponding to configuration states of devices, and if the data structure contains at least two regions, including a first and second region, corresponding to the device, and if the second region contains a devnode corresponding to the current configuration state of the device, and if sequence of bits identifying the current configuration state of the device exists in the first region, then selecting a devnode from the plurality of devnodes according to the bit sequence, the devnode representing the programmed configuration state of the device.

37. In a computer system having at least one configurable device and further having a memory, a method of storing the configuration state of a device, said method comprising the steps of:

ensuring that a data structure exists in the memory corresponding to configuration states of devices, including a step of creating the data structure if the data structure does not exist;

ensuring that the data structure contains at least a first region and a second region corresponding to the device, including a step of allocate additional memory such that the data structure contains at least two regions including a first and second region corresponding to the device if the data structure does not contain at least two regions corresponding to the device;

ensuring that the second region contains a devnode corresponding to the current configuration state of the device, including a step of adding a devnode corresponding to the current configuration state of the device to the second region if the second region does not contain a devnode corresponding to the current configuration state of the device;

converting an ordinal number, identifying the current configuration state of the device among the devnodes in the second region corresponding to the device, into a sequence of bits;

ensuring that the first region corresponding to the device has allocated thereto sufficient memory to accommodate the sequence of bits, including a step of allocating additional memory to the first region sufficient memory to accommodate the sequence of bits determining the number of devnodes in the second region corresponding to the device if the first region corresponding to the device would otherwise have allocated thereto insufficient memory to accommodate the sequence of bits; and writing to the first region the sequence of bits.

* * * * *